(12) United States Patent
Fronte et al.

(10) Patent No.: US 8,301,905 B2
(45) Date of Patent: Oct. 30, 2012

(54) SYSTEM AND METHOD FOR ENCRYPTING DATA

(75) Inventors: Daniele Fronte, Aix-en-Provence (FR); Eric Payrat, Simiane-collongue (FR); Annie Perez, Marseilles (FR)

(73) Assignee: Inside Secure, Aix-en-Provence (FR)

( * ) Notice: Subject to any disclaimer, the term of this patent is extended or adjusted under 35 U.S.C. 154(b) by 1171 days.

(21) Appl. No.: 11/517,641

(22) Filed: Sep. 8, 2006

(65) Prior Publication Data
US 2008/0062803 A1 Mar. 13, 2008

(51) Int. Cl.
*G06F 12/14* (2006.01)
(52) U.S. Cl. ............... 713/189; 380/1; 380/28
(58) Field of Classification Search ............ 365/230.03; 380/29
See application file for complete search history.

(56) References Cited

U.S. PATENT DOCUMENTS

| | | | |
|---|---|---|---|
| 4,799,152 A * | 1/1989 | Chuang et al. ................... 707/7 |
| 5,630,154 A * | 5/1997 | Bolstad et al. ................... 712/19 |
| 6,081,896 A | 6/2000 | Johns-Vano et al. | |
| 6,101,255 A | 8/2000 | Harrison et al. | |
| 6,434,699 B1 * | 8/2002 | Jones et al. ................... 713/168 |
| 6,763,365 B2 | 7/2004 | Chen et al. | |
| 6,978,016 B2 | 12/2005 | Chen et al. | |
| 7,451,326 B2 * | 11/2008 | Zaabab ................... 713/189 |
| 7,720,219 B1 * | 5/2010 | Olson et al. ................... 380/28 |
| 7,787,620 B2 * | 8/2010 | Kocher et al. ................... 380/28 |
| 7,831,039 B2 * | 11/2010 | Bertoni et al. ................... 380/28 |
| 7,996,652 B2 * | 8/2011 | Claydon et al. ................... 712/18 |
| 2003/0065696 A1 | 4/2003 | Ruehle et al. | |
| 2003/0065813 A1 | 4/2003 | Ruehle | |
| 2003/0108195 A1 * | 6/2003 | Okada et al. ................... 380/37 |
| 2004/0047466 A1 * | 3/2004 | Feldman et al. ................... 380/37 |
| 2004/0143747 A1 * | 7/2004 | Eckstein et al. ................... 713/189 |
| 2004/0184602 A1 * | 9/2004 | Nadehara ................... 380/28 |
| 2004/0186979 A1 * | 9/2004 | Janke et al. ................... 712/1 |
| 2005/0254656 A1 | 11/2005 | Rose et al. | |
| 2006/0059369 A1 | 3/2006 | Fayad et al. | |
| 2007/0195951 A1 * | 8/2007 | Leung, Jr. ................... 380/37 |
| 2008/0046263 A1 * | 2/2008 | Sager et al. ................... 705/1 |

FOREIGN PATENT DOCUMENTS

EP 1645992 A1 * 4/2006
(Continued)

OTHER PUBLICATIONS

Daniele Fronte et al., *The Advanced Encryption Standard (AES) Implemented into a Systolic Array Processor*, Atmel Smart Cards and Laboratoire Matériaux et Microélectronique de Province (L2MP), Apr. 5, 2006, pp. 1-18, France.

(Continued)

*Primary Examiner* — Jason K. Gee
*Assistant Examiner* — Amare F Tabor
(74) *Attorney, Agent, or Firm* — Schwegman Lundberg & Woessner, P.A.

(57) ABSTRACT

A system and method for encrypting data. The system includes a controller and a processing element (PE) array coupled to the controller. The PE array is operative to perform one or more of encryption functions and decryption functions using an encryption algorithm. According to the system and method disclosed herein, by utilizing the PE array, the system encrypts and decrypts data efficiently and flexibly.

15 Claims, 18 Drawing Sheets

FOREIGN PATENT DOCUMENTS

| | | |
|---|---|---|
| WO | WO-2008031109 A2 | 3/2008 |
| WO | WO-2008031109 A3 | 3/2008 |
| WO | WO-2008031109 A4 | 3/2008 |

OTHER PUBLICATIONS

*Announcing the Advanced Encryption Standard (AES)*, Federal Information Processing Standards Publication 197, Nov. 26, 2001, pp. 1-47.

International Application Serial No. PCT/US2007/78070, International Search Report and Written opinion mailed Sep. 15, 2008.

"Taiwanese Application Serial No. 096133588, Office Action mailed Jun. 14, 2011", with English translation, 10 pgs.

"Tawainese Application Serial No. 096133588, Response flied Sep. 18, 2011 to Office Action mailed Jun. 14, 2011", 4 pgs.

\* cited by examiner

|  | Name | SRC | DST | Parameters |
|---|---|---|---|---|
| Data Transfers | Load Row | CPU, RAM, ext | Row # | Autoincrement, xor, add, Address |
|  | Load Col | CPU, RAM, ext | Col # | Autoincrement, xor, add, Address |
|  | Load index A |  | Row # | Autoincrement, xor, add, Address |
|  | Store Row | Row # | CPU, RAM, ext | CPU_request, Address |
|  | Store Col | Col # | CPU, RAM, ext | CPU_request, Address |
|  | Store index A | data |  |  |
| Op Array | Shift |  |  | # times, PE enables, NSWE |
|  | Xor |  |  | PE enables |
|  | Nop |  |  |  |

FIG. 9

| $d_{11}$ | $d_{12}$ | $d_{13}$ | $d_{14}$ |
|---|---|---|---|
| $d_{21}$ | $d_{22}$ | $d_{23}$ | $d_{24}$ |
| $d_{31}$ | $d_{32}$ | $d_{33}$ | $d_{34}$ |
| $d_{41}$ | $d_{42}$ | $d_{43}$ | $d_{44}$ |

| $PE_{11}$ | $PE_{12}$ | $PE_{13}$ | $PE_{14}$ |
|---|---|---|---|
| $PE_{21}$ | $PE_{22}$ | $PE_{23}$ | $PE_{24}$ |
| $PE_{31}$ | $PE_{32}$ | $PE_{33}$ | $PE_{34}$ |
| $PE_{41}$ | $PE_{42}$ | $PE_{43}$ | $PE_{44}$ |

Sbox Table

Logarithm Table

Anti-Logarithm Table

SYSTEM AND METHOD FOR ENCRYPTING DATA

FIELD OF THE INVENTION

The present invention relates to computer systems, and more particularly to a system and method for encrypting data.

BACKGROUND OF THE INVENTION

Data encryption is well known and is typically used to provide security for data that may be transmitted within or across communication systems such as the Internet. Cryptographic chips may be used to implement data encryption functions. For example, a cryptographic chip may perform cryptographic functions involving electronic keys that may be required to execute functions or code on a given device. Such functions may include, for example, accessing data in a memory device. A problem with conventional data encryption solutions is that they themselves may have security vulnerabilities. For example, a cryptographic chip may be vulnerable to side-channel attacks. A side-channel attack is an attack on information gained from implementation of a cryptosystem. Such information may include timing information, electro-mechanical information, power information can be exploited to acquire sensitive data from a system.

Accordingly, what is needed is an improved system and method for encrypting data. The present invention addresses such a need.

SUMMARY OF THE INVENTION

A system for encrypting data is disclosed. The system includes a controller and a processing element (PE) array coupled to the controller. The PE array is operative to perform one or more of encryption functions and decryption functions using an encryption algorithm.

According to the system and method disclosed herein, by utilizing the PE array, the system encrypts and decrypts data efficiently and flexibly.

BRIEF DESCRIPTION OF THE DRAWINGS

FIG. 9 is a table showing exemplary operation code of the crypto-processor of FIG. 2, in accordance with the present invention.

FIG. 11 is a block diagram of an Advanced Encryption Standard (AES) matrix in accordance with the present invention.

FIG. 12 is a block diagram of a PE matrix in accordance with the present invention.

FIG. 15 is an exemplary S-Box table in accordance with the present invention.

FIG. 19 is an exemplary logarithm table in accordance with the present invention.

FIG. 20 is an exemplary anti-logarithm table in accordance with the present invention.

DETAILED DESCRIPTION OF THE INVENTION

The present invention relates to computer systems, and more particularly to a system and method for encrypting data. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention for encrypting data are disclosed. The system includes a cryptographic processor that is built around a systolic array of processing elements (PEs). In one embodiment, a systolic array is a matrix of processors that substantially simultaneously execute the same operations. In another embodiment, the systolic array may separately perform different operations. The cryptographic processor may encrypt or decrypt data by using an encryption algorithm. In one embodiment, the cryptographic processor architecture implements the Advanced Encryption Standard (AES) algorithm to encrypt/decrypt data. By utilizing the systolic array of PEs, the cryptographic processor encrypts and decrypts data efficiently and flexibly. To more particularly describe the features of the present invention, refer now to the following description in conjunction with the accompanying figures.

Although the present invention disclosed herein is described in the context of an AES algorithm, the present invention may apply to other types of encryption algorithms, as well as other applications, and still remain within the spirit and scope of the present invention.

Figure 1:
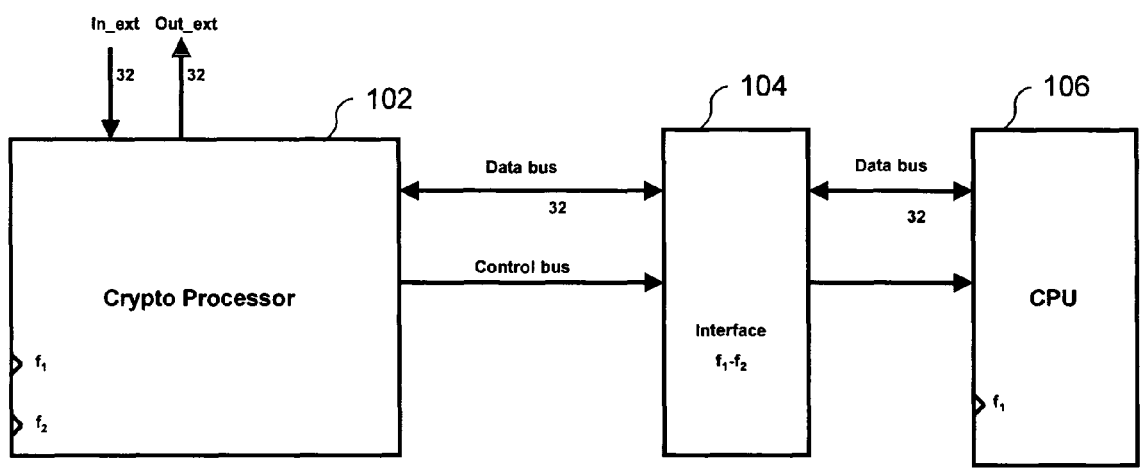
FIG. 1 is a block diagram of a system for encrypting data in accordance with the present invention.

FIG. 1 is a block diagram of a system 100 for encrypting data in accordance with the present invention. The system 100 includes a cryptographic processor (or crypto-processor) 102, an interface unit 104, and a central processing unit (CPU) 106. In operation, the crypto-processor 102 encrypts and/or decrypts data by using an encryption algorithm, which in one embodiment may involve the AES algorithm to encrypt/decrypt data. One embodiment of the crypto-processor 102 is described in more detail below in FIG. 2.

Figure 2:
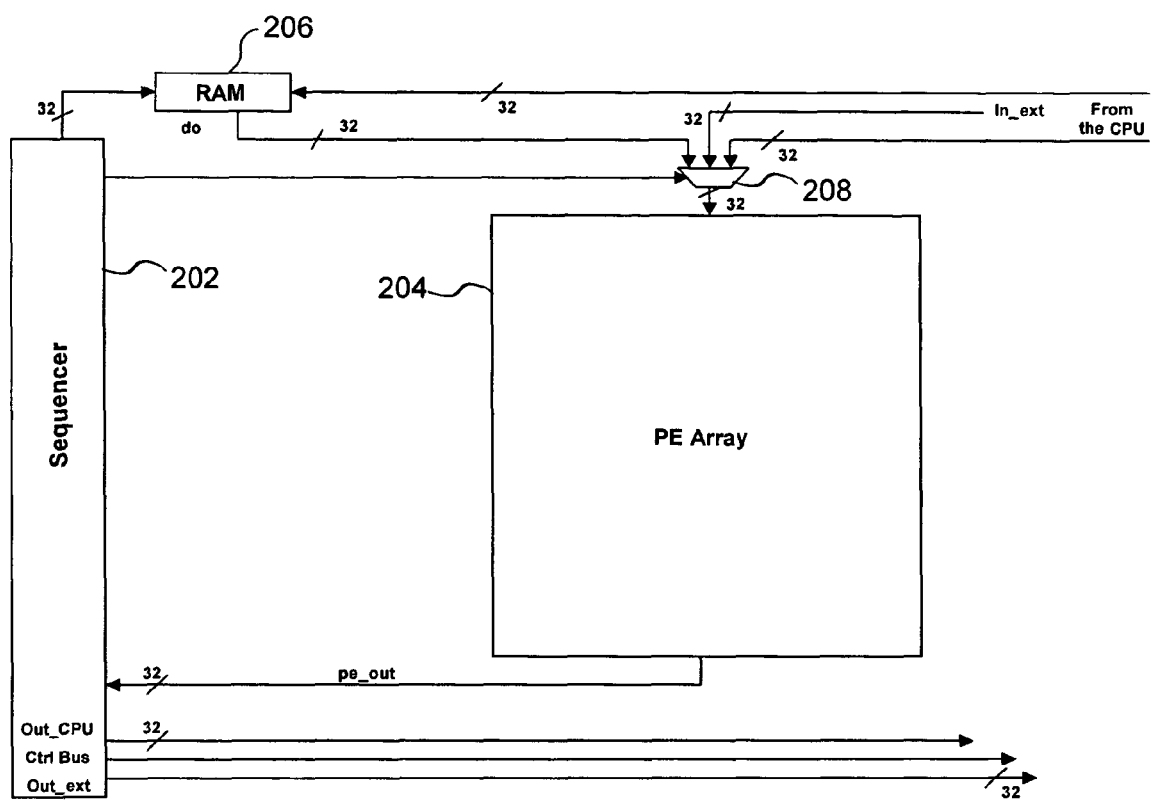
FIG. 2 is a block diagram of a crypto-processor, which may be used to implement the crypto-processor of FIG. 1, in accordance with the present invention.

FIG. 2 is a block diagram of a crypto-processor 200, which may be used to implement the crypto-processor 102 of FIG. 1, in accordance with the present invention. The crypto-processor 200 includes a controller or sequencer 202, a processing elements (PE) array 204, and a local memory 206. In operation, the sequencer 202 controls the PE array 204 and also manages data exchanged between the PE array 204 and the CPU 106 (FIG. 1). Accordingly, the PE array 204 is configured to receive input commands and data (to encrypt/decrypt) from the sequencer 202 and is also configured to receive/transmit encrypted/decrypted data to the sequencer 202. In one embodiment, the local memory 206 may be a random access memory (RAM) unit or any other suitable memory unit. One embodiment of the sequencer 202 is described in more detail below in connection with FIG. 8.

Figure 3:
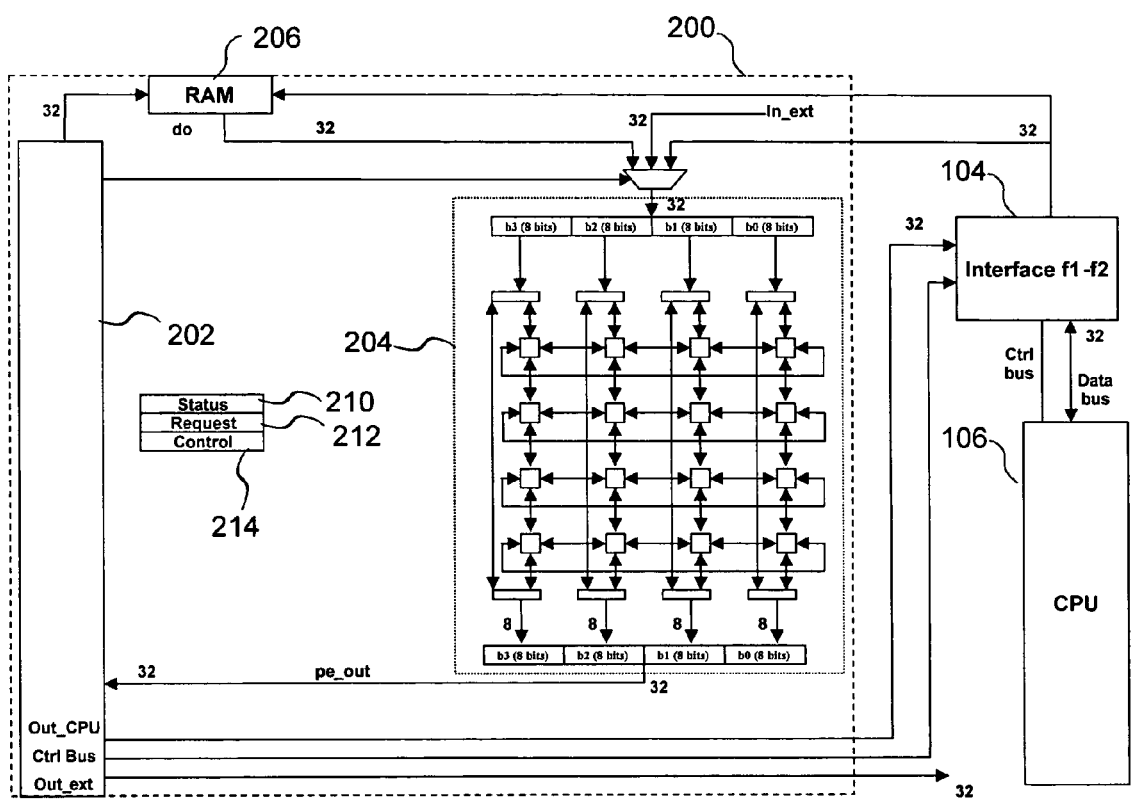
FIG. 3 is a more detailed block diagram of the crypto-processor of FIG. 2, in accordance with the present invention.

FIG. 3 is a more detailed block diagram of the crypto-processor 200 of FIG. 2, in accordance with the present invention. The crypto-processor 200 includes the sequencer 202, the PE array 204, the local memory (e.g., RAM 206, a status register 210, a request register 212, and a control register 214. The crypto-processor 200 is operatively coupled to the interface unit 104 and the CPU 106. In operation, the crypto-processor 200 may exchange data with both the CPU 106 and/or an external device (not shown). The external device may be, for example, a network card that transmits/receives a data stream to be encrypted/decrypted by the crypto-processor 200. In one embodiment, the crypto-processor 200 may use a different clock from that of the CPU 106. The presence of a control interface between the CPU 106 and the crypto-processor 200 allows the use a different clock (e.g., higher clock frequency for the crypto processor 200 than for the CPU 106). Accordingly, the interface unit 104 enables communication between the CPU 106.

Because the crypto-processor 200 utilizes the PE array 204 to encrypt or decrypt data, the crypto-processor 200 is protected against side-channel attacks. As described above, a side-channel attack is an attack on information gained from implementation of a cryptosystem. For example, information such as timing information, electro-mechanical information, and power information can be exploited to acquire sensitive data from a system. In accordance with the present invention, the PE array 204 is operative to prevent side-channel attacks because the PE elements substantially simultaneously perform the same functions as one another and create noise (e.g., electrical and algorithmic noise). In one embodiment, the PE array is operative to perform operations that generate noise to distract or eliminate the ability of an agent from detecting information sensitive data.

Processor Elements Array

Figure 4:
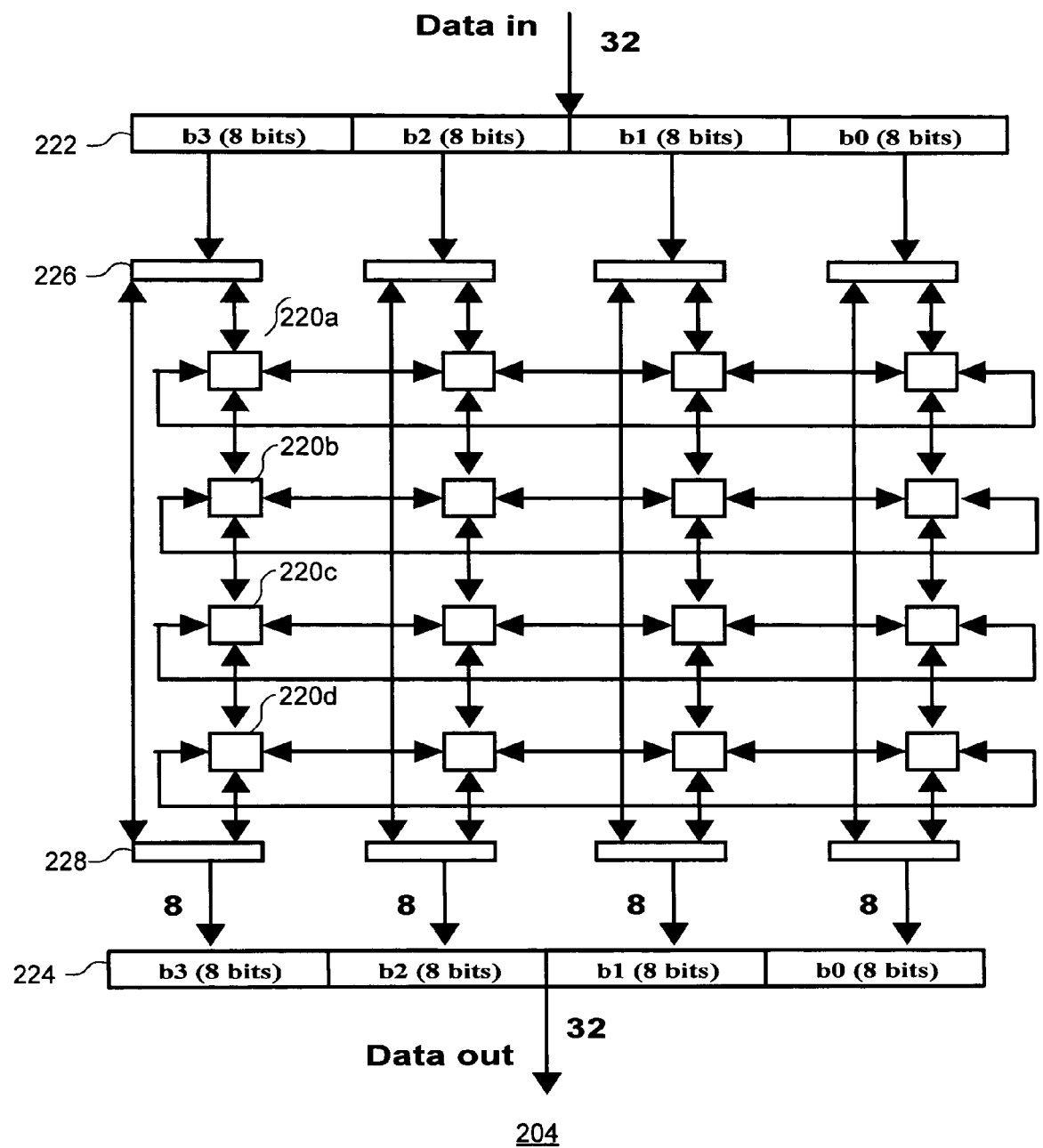
FIG. 4 is a block diagram of the process element (PE) array of FIG. 3 in accordance with the present invention.
Figure 5:
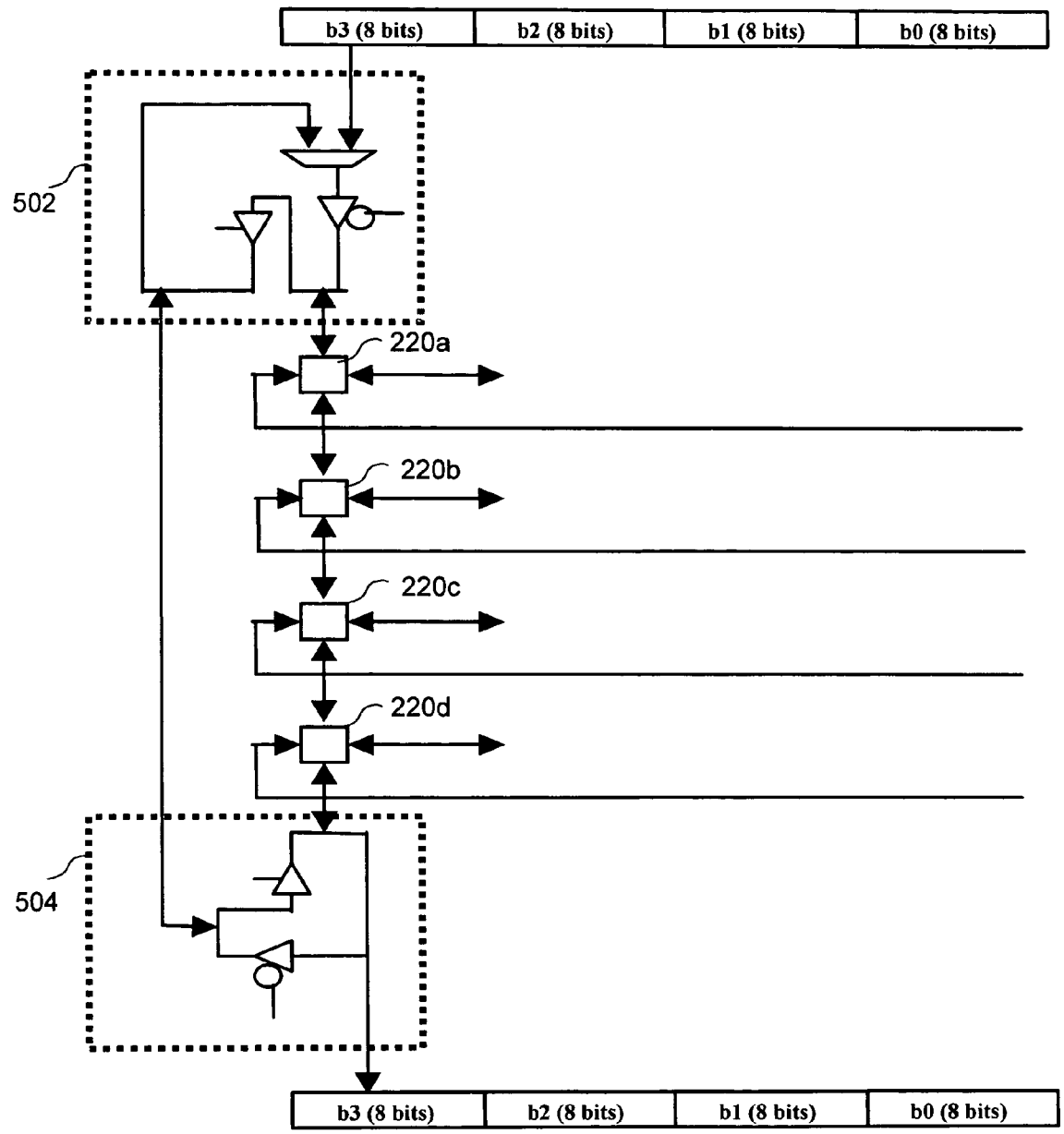
FIG. 5 is a block diagram of the left/east-most column of a PE array, including input/output (I/O) units, which may be used to implement the I/O units of FIG. 4, respectively, in accordance with the present invention.

FIG. 4 is a block diagram of the PE array 204 of FIG. 3 in accordance with the present invention. The PE array 204 includes PEs 220a, 220b, 220c, 220d, etc., 2-dimensional input/output (2D I/O) structures 222 and 224, and I/O units 226 and 228, etc. As FIG. 4 illustrates, in one embodiment, the PE array 204 is configured in a 4×4 matrix. Although the present invention disclosed herein is described in the context of a PE array having 16 PEs arranged in a 4×4 matrix, the present invention may apply to any number of PEs having other configurations, and still remain within the spirit and scope of the present invention. In one embodiment, all of the PEs are identical such that they perform the same operations. This enables the crypto-processor 200 to function more efficiently. As FIG. 4 illustrates, in one embodiment, the PEs 220 are coupled to each other in a tore fashion. A tore fashion means that the eastern frontier of the array is linked with the western frontier (like in a cylindrical fashion, with the main axis parallel with the north-south direction), and the northern frontier of the array is linked with the southern frontier (like in a cylindrical fashion, with the main axis parallel with the east-west direction). Also, in one embodiment, each PE 220 has 4 data input/outputs (I/Os) to/from each cardinal direction: north, east, south, and west, where the 4 data I/Os connect to 4 respective neighboring PEs. In one embodiment, each I/O data is 1 byte. In one embodiment, the PEs 220 receive data from one cardinal direction (e.g., from the north) and transmits data to another cardinal direction (e.g., to the South). FIG. 5 is a block diagram of the left/east-most column of a PE array, including I/O structures 502 and 504, which may be used to implement the I/O structures 226 and 228 of FIG. 4, respectively, in accordance with the present invention.

In one embodiment, the PEs 220 may perform the same operations and may perform these operations substantially simultaneously. This is the case while in a Single Instruction Multiple Data (SIMD) mode. In another embodiment, the PEs 220 may separately perform different operations. This is the case in a Multiple Instruction Multiple Data (MIMD) mode. For instance, data may be shifted in all of the PEs 220 except for those stored in one line of the PE array 204. As described in more detail below, an "Enable_PE" signal enables or disables the PEs 220. For example, the "Enable_PE" signal may activate the PEs for a shift operation only, and disable the others. In one implementation, the enable signals may be managed in order to increase the algorithmic noise. For instance, one shift operation of data of the PE array may be split into two arrays, thereby managing enable signals twice. This may in some cases slow down the operation, but it enables the tracking of a side-channel hacker.

Processor Element

Figure 6:
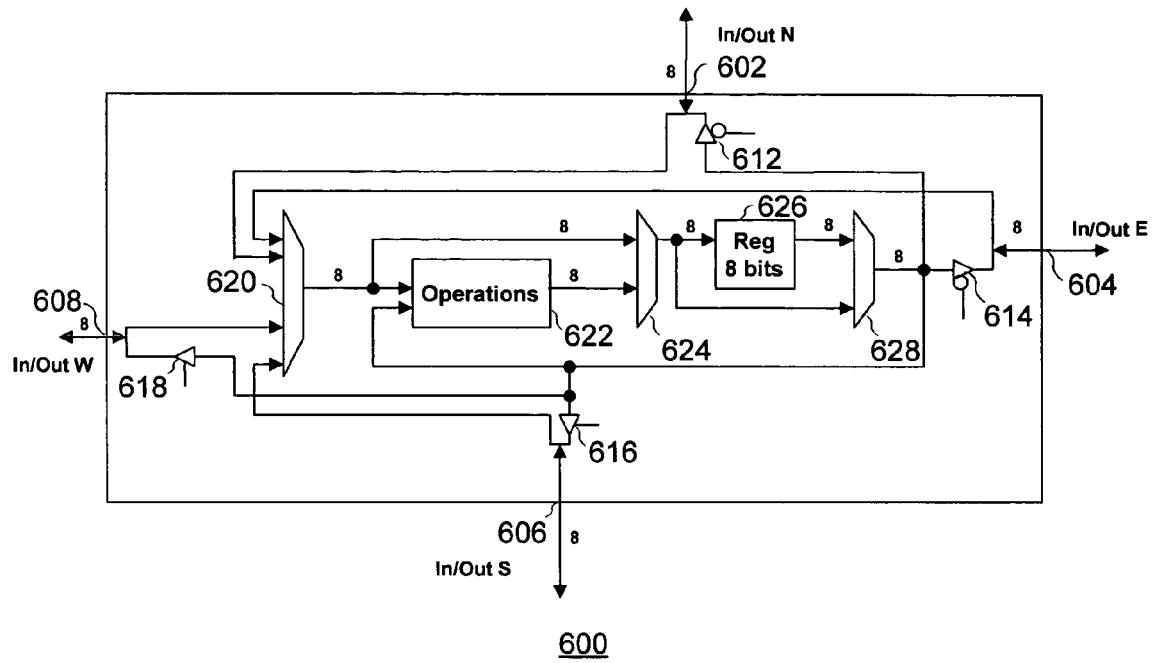
FIG. 6 is a block diagram of a PE, which may be used to implement a PE of FIG. 4, in accordance with the present invention.

FIG. 6 is a block diagram of a PE 600, which may be used to implement a PE 220 of FIG. 4, in accordance with the present invention. The PE 600 includes I/O ports 602, 604, 606, and 608 (having respective I/O enable units 612, 614, 616, and 618), input-select multiplexor (or mux) 620, an operations unit 622, which includes a clock (not shown). The PE 600 also includes a register mux 624, a register 626, and an output mux 628. As described above, referring again to FIG. 3, the PE array 204 is configured to receive input commands and data (to encrypt/decrypt) from the sequencer 202, and is also configured to receive and transmit encrypted/decrypted data to the sequencer 202. The I/O enable units 612, 614, 616, and 618 control whether their respective I/O ports 602, 604, 606, and 608 function as inputs or outputs to receive or transmit instructions or data, and the input-select mux 610 selects appropriate I/Os inputs from which to receive instructions and/or data for encryption/decryption. The operations unit 612 receives the instructions and data for encryption/decryption and then encrypts or decrypts the data using an encryption algorithm, the process of which is described in detail below, beginning at FIG. 10.

In operation, the input-select mux 620 performs a select-PE-in function, where the input-select mux 620 selects an input from which to load data (e.g., from a northern, eastern, western or southern input). The operations unit 622 performs various functions/instructions used in data encryption and decryption. For example, the operations unit 622 may perform select operations, where the operations unit 622 selects exclusive-OR (XOR) and addition operations. The operations unit 622 performs encryption-related and/or decryption-related operations such as read/write operations. For example, in a shift_W2E operation, the operations unit 622 may read from a western/eastern PE and/or may write to a western/eastern PE. In a shift_N2S operation, the operations unit 622 may read from a northern/southern PE and/or write to a northern/southern PE. The register mux 624 performs a select-register-in function, where the register 624 selects between data computed by the operations unit 622 or previously computed data (e.g., from another PE). Some of the data may be stored in the register 626. The output mux 628 performs a select-PE-out function, where the output mux 628 selects previously registered data or non-registered data stored in the register 626.

Figure 7:
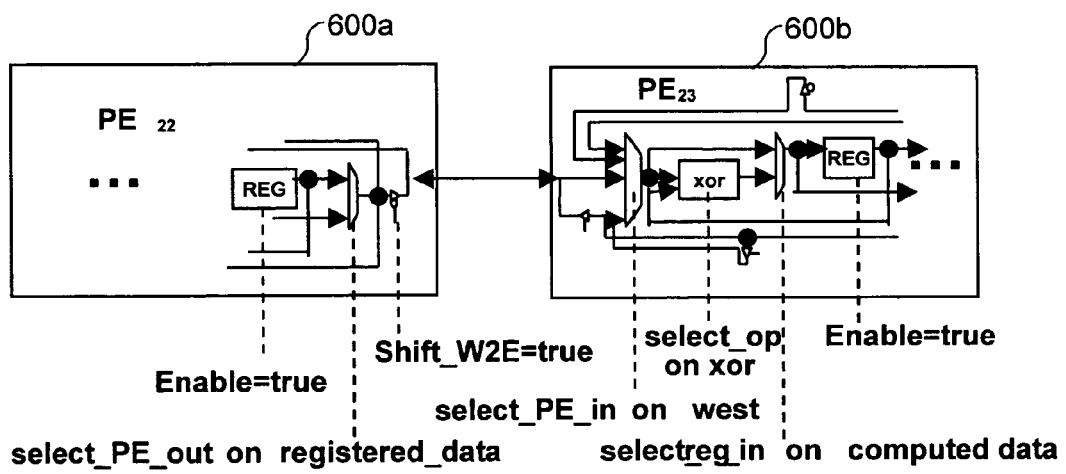
FIG. 7 is a block diagram of two PEs in accordance with one embodiment of the present invention.

FIG. 7 is a block diagram of two PEs 600*a* and 600*b*, in accordance with one embodiment of the present invention. In one embodiment, a given PE 600 may execute one instruction at a time. When a control signal is activated, the PE 600 determines whether other instructions are in progress. If not, the PE 600 performs the requested instruction. Otherwise, the PE 600 performs the previous instruction. Two algebraic operations are available: the "XOR" and the "addition" over 8 bits, between the data registered data and the incoming data.

In one embodiment, each PE 600 performs the following inner functions/instructions (of no particular order):
Load data from near-neighbor cells;
Load data from the RAM, or the CPU, or an external source (for array frontier's PE only); Referring to FIG. 1200, examples of the array frontier's PEs may include:
$PE_{11}$, $PE_{12}$, $PE_{13}$, $PE_{14}$ (northern frontier)
$PE_{41}$, $PE_{42}$, $PE_{43}$, $PE_{44}$ (southern frontier)
Although the present invention disclosed herein has been described in the context of the inputs of the PE array being located at the northern frontier and the outputs of the PE array being located at the southern frontier, the inputs and outputs of the PE array may be at any other array frontier, and still remain within the spirit and scope of the present invention. For example, the inputs may alternatively be located at the southern array frontier, the western array frontier ($PE_{11}$, $PE_{21}$, $PE_{31}$, $PE_{41}$), or eastern array frontier ($PE_{14}$, $PE_{24}$, $PE_{34}$, $PE_{44}$). Similarly, the outputs may alternatively be located at the northern, western, or eastern array frontiers.
Write data into near neighbor cells;
Write data into the RAM, or the CPU, or an external source (for array frontier's PE only);
XOR; and
Addition.

If the algorithm requires that an XOR operation be performed on the output values of the PEs 600*a* and 600*b* (same row, different column) and that the result be stored the in the PE 600*b*, the sequencer 202 may provide the following commands: enable PE 600*a* and PE 600*b* (disable all other PEs), select_PE_out on registered data, shift_W2E, and select_PE_in on the east input.

The Sequencer

Figure 8:
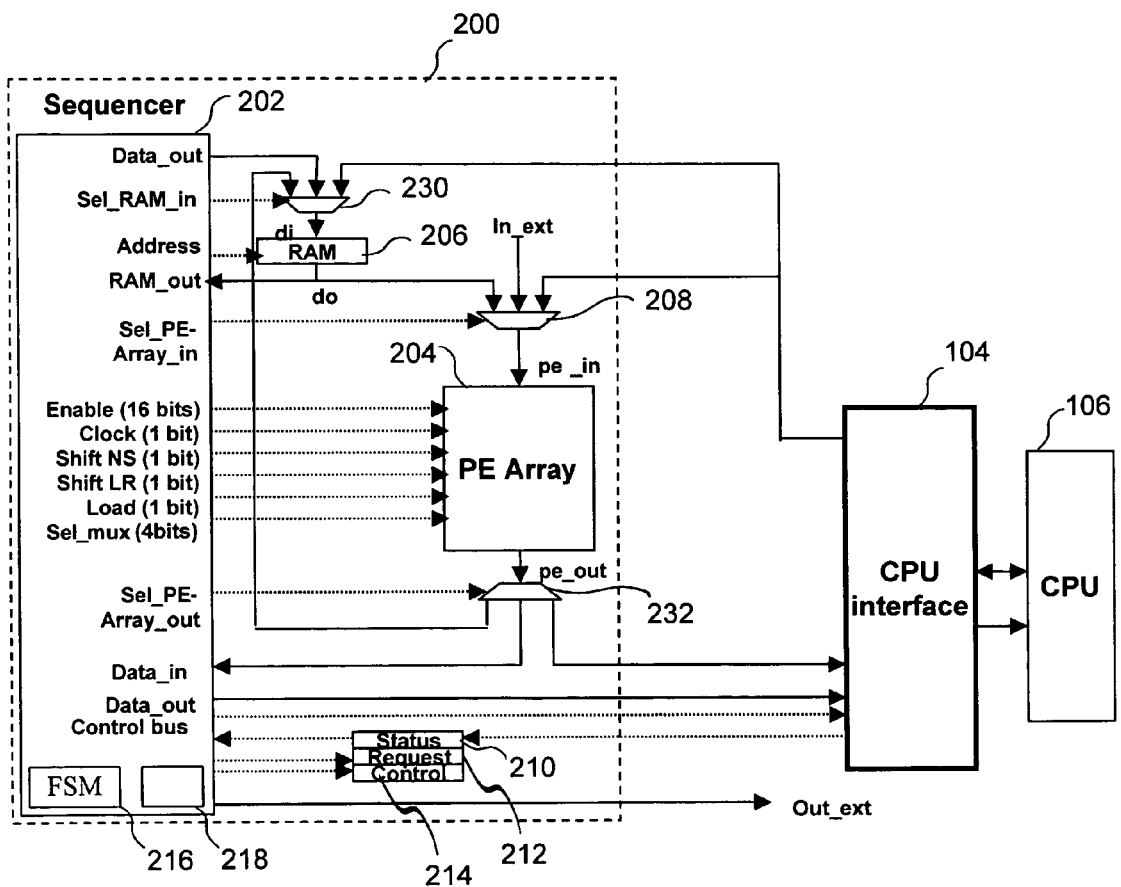
FIG. 8 is a block diagram of the sequencer of FIG. 2 in accordance with the present invention.

FIG. 8 is a block diagram of the sequencer 202 of FIG. 2 in accordance with the present invention. In one embodiment, the sequencer 202 includes finite state machine (FSM) 216 and storage elements 218. In operation, the sequencer 202 generates command signals for the PE array 204 and the instructions for the CPU 106. The sequencer 202 also manages, exchanges, and transmits data for the PE array 204.

In one implementation, the status, request, and control registers 210, 212, and 214 function as a communication interface between the CPU 106 and the crypto processor 200. The status and request registers 210 and 212 are utilized when the sequencer 202 makes a request to the CPU 106. The following is an example of an exchange protocol:
the sequencer 202 writes the type of the request for the CPU 106 to perform (e.g., a memory access, a computation, etc.), and the request is written into the request register 212 of the communication interface;
the request register 212 is read by the CPU 106;
the CPU 106 writes its status (e.g., free, busy, acknowledge) into the status register 210; when the request is accomplished, the CPU 106 sets the status register 210 to the acknowledge status; and
the sequencer 202 reads the status of its request in the status register 210.
The control register 214 is set by the sequencer 202, and the control register 214 gives its status (e.g., work in progress, encryption/decryption complete, etc.) to the CPU 106.

FIG. 9 is a table showing exemplary operation code of the crypto-processor 200 of FIG. 2, in accordance with the present invention. In one embodiment, the crypto-processor 200 performs the following operations.

In one embodiment, a load row operation copies a 32-bit word from the CPU 106, the RAM 206 or from an external source, and write it into a row of the PE array 204. In one embodiment, parameters may include:
"address": if the RAM 206 is selected as source;
"XOR": to XOR the word with the word previously stored in the selected row of the PE array 204; and
"add": to concatenate the word with the word previously stored in the selected row of the PE array 204.

In one embodiment, a load column operation copies a word (e.g., a 32-bit word) from the CPU 106, the RAM 206 or from an external source, and write it into a column of the PE array 204. In one embodiment, parameters may include:
"address": if the RAM 206 is selected as source;
"XOR": to XOR the word with the word previously stored in the selected column of the PE array 204;
"add": to concatenate the word with the word previously stored in the selected column of the PE array 204.

In one embodiment, a load index A operation copies a word (e.g., a 32-bit word) from the RAM 206 at the address given by the "address" parameter+ the offset given register A, into a row of the PE array 204. In one embodiment, parameters may include:
"Address";
"XOR": to XOR the word with the word previously stored in the selected row of the PE array 204;
"add": concatenate the word with the word previously stored in the selected row of the PE array 204.

Store Row: copy a word (e.g., a 32-bit word) from a row of the PE array 204 and write it into the CPU 106, the RAM 206, or from an external source. In one embodiment, parameters may include:
"address": if the RAM 206 is selected as destination; and
"CPU_request": if the CPU 106 is selected as destination.

Store Column: copy a word (e.g., a 32-bit word) from a column of the PE array 204 and write it into the CPU 106, the RAM 206 or from an external source. In one embodiment, parameters may include:
"address": if the RAM 206 is selected as destination; and
"CPU_request": if the CPU 106 is selected as destination.

Store index A: write a word (e.g., a 32-bit word) to the register A). The sequencer 202 includes several registers. In one embodiment, the sequencer 202 may include the following registers:
A, 32 bits;
B, 10 bits;

I, 32 bits, it contains the micro instruction which is executed;

Counter_address, 10 bits, to address up to 1024 memory locations; and

Current_state, Next_state, each one of 5 bits, they are needed by the FSM.

Sequencer Inputs and Outputs

In one embodiment, the inputs of the sequencer 202 accept data from up to three possible sources:

a 32-bit word from the PE array 204;

a 32-bit word from the RAM 206; and the acknowledge signal from the CPU 106 (status register).

In one embodiment, the sequencer 202 outputs the following data:

Clock (1 bit);

Sel_RAM: to select the input of the RAM 206 between the Data_out (from the sequencer itself), the output of the CPU and the pe_out (the output of the PE Array 204);

Address: to address the RAM 206;

Sel_PE-Array_in: to select the input of the PE array 200 between the RAM 206, the CPU, and the external source;

Load: to load data from pe_in (the source is selected by Sel_PE-array_in) into the PE (the ones that are enabled);

Enable: to enable the PE. The width of this bus is 4×4 bits (one wire for each PE);

shift W2E: to shift the byte of each PE into its neighbor, from west to east (or vice-versa), only for enabled PE;

shift N2S: to shift the data of each PE into its neighbor, from north to south (or vice-versa), only for enabled PE;

Sel_mux: to manage the muxes inside each PE;

Sel_PE-Array_out: to select the output of the PE-Array between the RAM 206, the CPU, and the external device (via the sequencer);

Control (bus): to manage the communication with the CPU 106;

Request (register): to manage the communication with the CPU 106; and

Control (register): to manage the communication with the CPU 106.

Data Encryption by the Crypto-Processor

In one embodiment, the sequencer 202 reads the instruction to be executed from the RAM 206. The core of the sequencer 202 contains an FSM 216 (FIG. 8) that manages the output of the RAM 206. The data stored in the RAM 206 may have the format described by the Table shown in FIG. 9. In one embodiment, some of the operational code may be described as follows, where the "x" most significant bits (MSBs) code the instructions, which are executed by the FSM 216:

| Operation code | Source | Destination | Parameters |
|---|---|---|---|
| X bits (MSB) $b_n b_{n-1} b_{n-2} \ldots b_{n-x+1}$ | | n−x bits (LSB) $b_{n-x} b_{n-x-1} \ldots b_1 b_0$ | |

Figure 10:
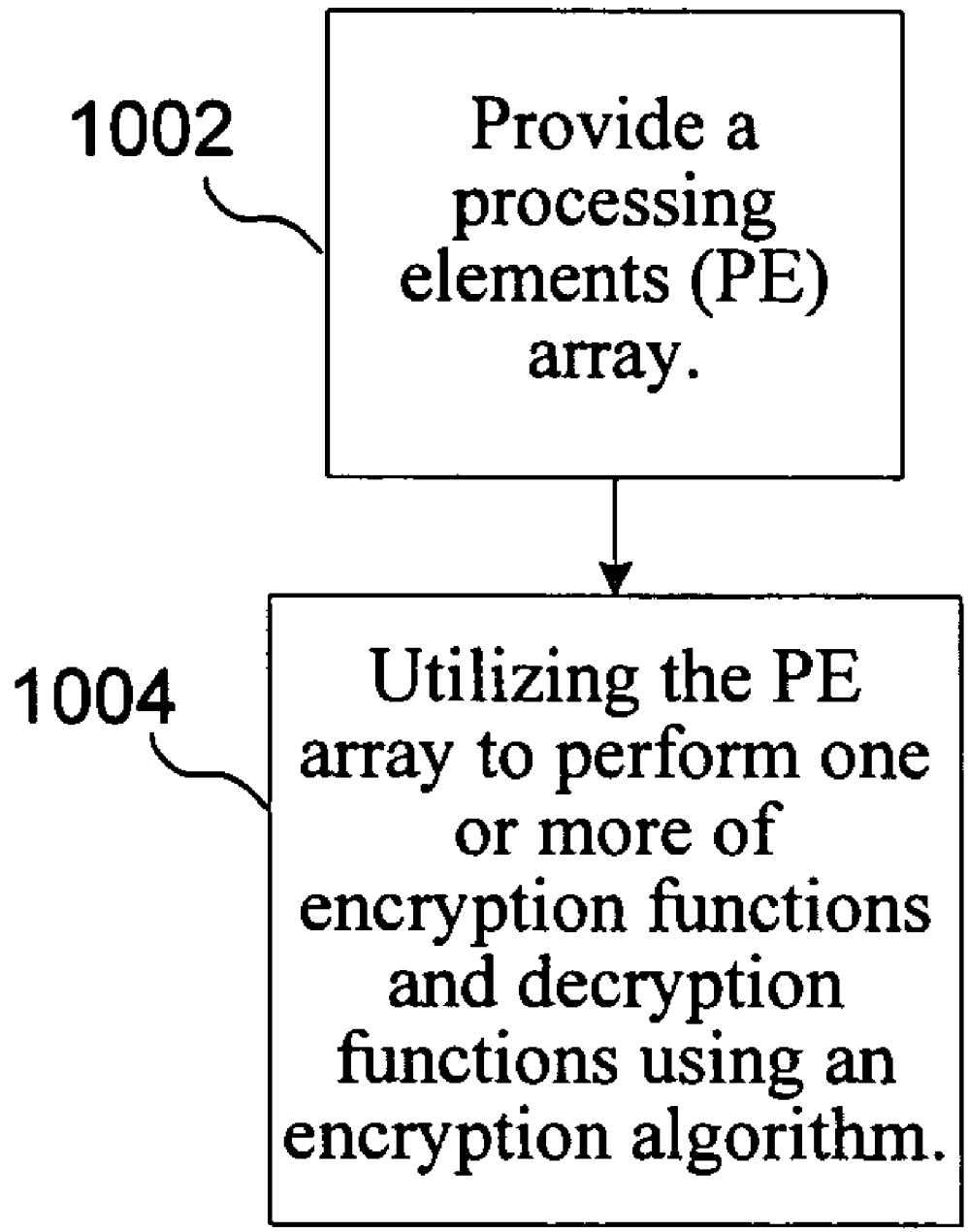
FIG. 10 is a flow chart showing a method for encrypting data in accordance with the present invention.

FIG. 10 is a flow chart showing a method for encrypting data in accordance with the present invention. Referring to both FIGS. 3 and 10 together, the process begins in a step 1002 where the crypto-processor 200 provides a PE array 204 for storing data. Next, in a step 1004, the crypto-processor 200 performs one or more of encryption functions and decryption functions using an encryption algorithm. In one embodiment, the crypto-processor 200 performs cryptographic transformations on the data stored in the PE array.

The cryptographic transformations are described in detail below in connection with FIG. 13.

FIG. 11 is a block diagram of an AES matrix 1100 in accordance with the present invention. In one embodiment, the AES matrix includes 128-bit data blocks arranged in a 4×4 matrix. The AES specifies a Federal Information Processing Standards (FIPS) approved cryptographic algorithm that may be used to protect electronic data. The AES algorithm is a symmetric block cipher that can encrypt (encipher) and decrypt (decipher) information. The AES algorithm is capable of using cryptographic keys of 128, 192, and 256 bits. These different versions may be referred to as AES-128, AES-192 and AES-256, respectively. In one embodiment, the crypto-processor 102 utilizes AES-128 as the AES algorithm, where the plain text consists of 128-bit data blocks and each block may be managed as a matrix of 4×4 bytes. Although the present invention disclosed herein is described in the context of 128-bit data blocks, the present invention may apply to other size data blocks (e.g., 192-bit, 256-bit, etc.) and still remain within the spirit and scope of the present invention.

FIG. 12 is a block diagram of a PE matrix 1200 in accordance with the present invention. As FIG. 12 illustrates, the PE matrix data block is arranged in a 4×4 matrix. In one embodiment, the crypto-processor 102 maps AES transformations with the PE array, where each element of the AES matrix 1100 may be mapped to a PE of the PE matrix 1200. As such, every PE is mapped to a byte of plain text. In one embodiment, referring to FIGS. 4 and 12, a byte of data stored in a PE (e.g., $PE_{11}$) of FIG. 12 corresponds to a byte of data stored in a PE (e.g., 220a) of FIG. 4.

Figure 13:
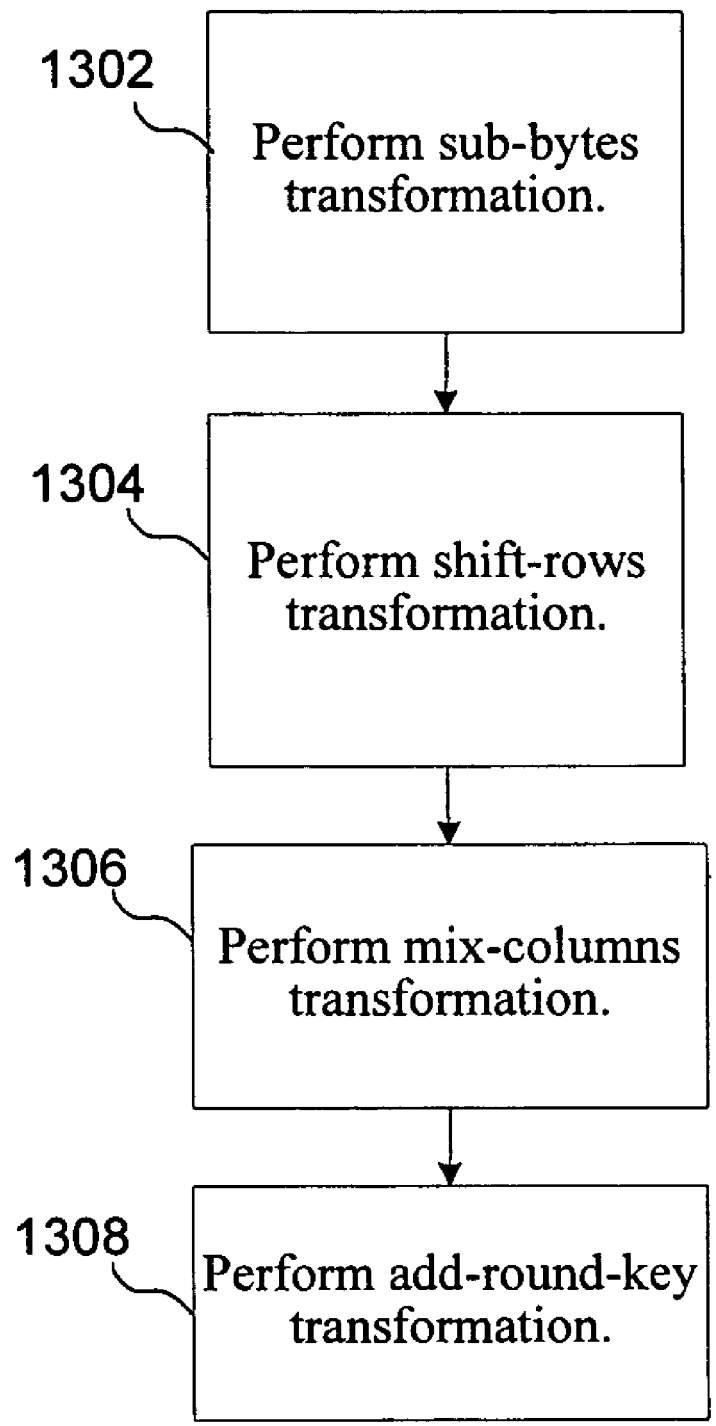
FIG. 13 is a flow chart showing a method for performing cryptographic transformations in accordance with the present invention.

FIG. 13 is a flow chart showing a method for performing cryptographic transformations in accordance with the present invention. Referring to both FIGS. 3 and 13 together, the process begins in a step 1302 where the crypto-processor 200 performs a sub-bytes transformation. Next, in a step 1304, the crypto-processor 200 performs a shift-rows transformation. Next, in a step 1306, the crypto-processor 200 performs a mix-columns transformation. Finally, in a step 1308, the crypto-processor 200 performs an add-round-key transformation. In one embodiment, the encryption process includes 10 rounds, where each round involves the above transformations. The following paragraphs describe each transformation in detail.

Sub-Bytes Transformation

Figure 14:
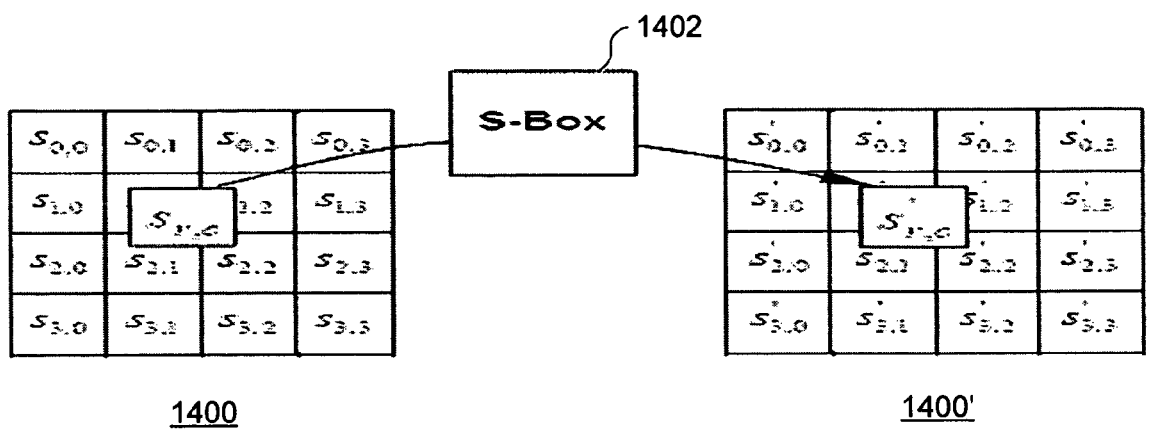
FIG. 14 is a block diagram illustrating a sub-byte transformation, which may be used to implement the sub-byte transformation of FIG. 13, in accordance with the present invention.
Figure 15:
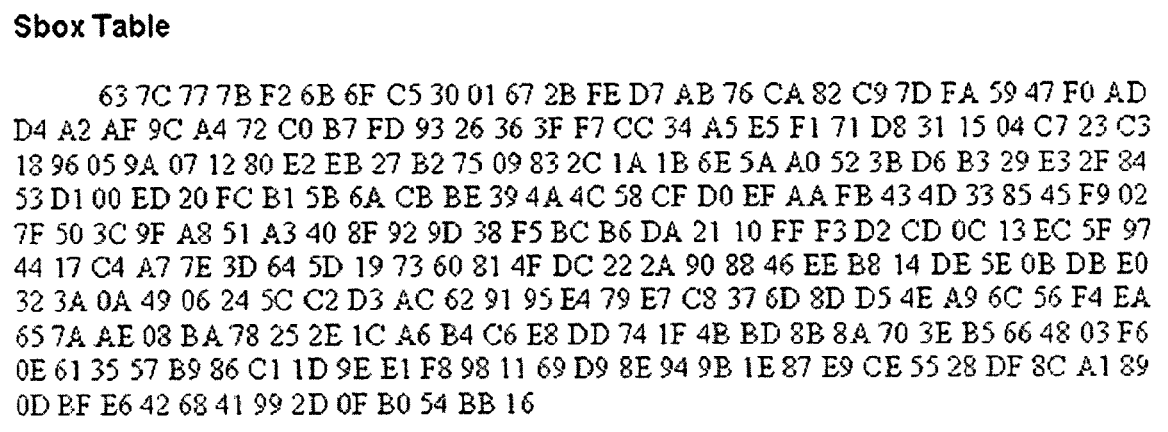

FIG. 14 is a block diagram illustrating a sub-byte transformation, which may be used to implement the sub-byte transformation of box 1302 of FIG. 13, in accordance with the present invention. Each byte stored in the PE array 1400 is substituted with a corresponding byte in the substitution box table (S-Box table) 1402. An S-Box is a non-linear substitution table used in the Sub-Byte transformations. In one embodiment, the S-Box table may be stored in the RAM 206. FIG. 15 is an exemplary S-Box table in accordance with the present invention. In one embodiment, the FSM 216 (FIG. 8) may manage one word of 4 bytes and may provide all needed commands for the substitution of all 4×4 1-byte data. In one embodiment, the sequencer 202 selects the PE array output (e.g., at its Sel_PE-Array_out output). For each received word, the FSM 216 substitutes a single byte at a time. For each byte in the PE array, the FSM 216 searches for a corresponding byte in the S-Box table. In one embodiment, since the S-Box table is stored in the RAM, the FSM 216 searches the following address: address=Sbox_table_address+offset. The offset is given by the byte that needs a sub-byte transformation.

Figure 16:
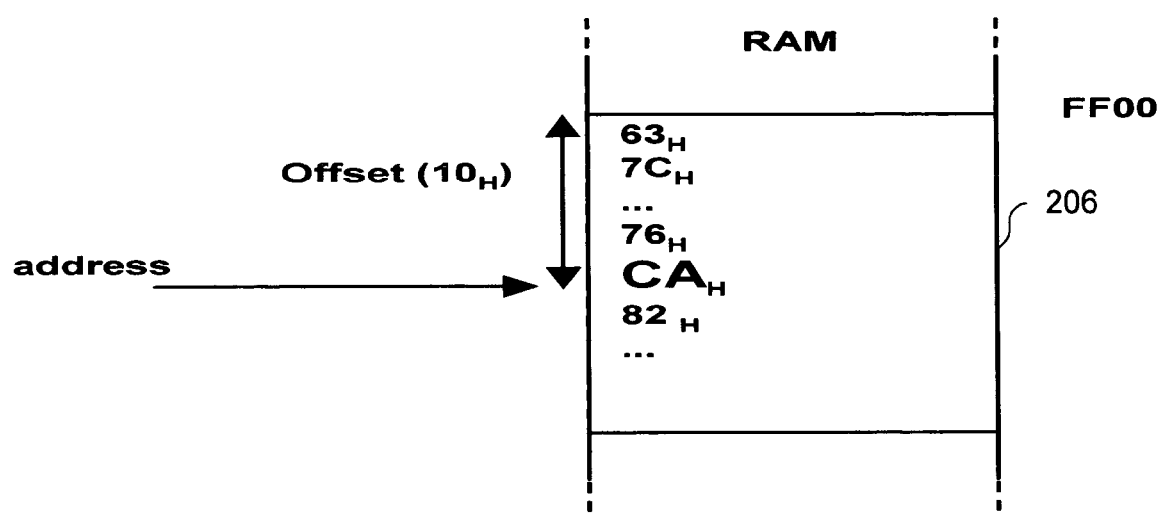
FIG. 16 is a block diagram illustrating a portion of the RAM in accordance with the present invention.

FIG. 16 is a block diagram illustrating a portion of the RAM 206 in accordance with the present invention. If the byte "10(16)" is to be substituted, for example, the S-Box tables are recorded at the address "FF00(16)": address=FF00+10=FF10. The following is an example of a S-Box transformation. In the expression RAM [FF10$_{(16)}$]=CA$_{(16)}$, both 10$_H$ and 10$_{16}$ mean 10 in hexadecimal format, i.e., 16 in decimal format. The data 10$_H$ is substituted using the S-Box table. The S-Box table substitutes 10$_H$ with CA$_H$. In this example, S-Box tables are stored in the RAM at the address FF00$_H$. The FSM reads the RAM at the address given at the statement 56. More precisely, the FSM activates the enable_ram signal, and computes the RAM'S address in the following way: Address=FF00$_H$+10$_H$=FF10$_H$. In the RAM, at the above address, there is a written the value CA$_H$, because the 17th data of the S-Box table is CA$_H$ (the table starts at 0, so the data 'n'is the 'n-1' element, see the FIG. 15). Accordingly, RAM [FF10$_H$]=CA$_H$.

Then data RAM[address] is written into the PE-array. In one embodiment, the FSM 216 actives a Sel_PE-Array_in function to select the RAM 206 as input to the PE array 204 and actives a shift_NS function to shift all bytes from north to south. As such, the FSM 216 may write and read simultaneously to or from the PE array 204. These instructions are repeated until all 4×4 bytes are substituted.

Shift-Rows Transformation

Figure 17:
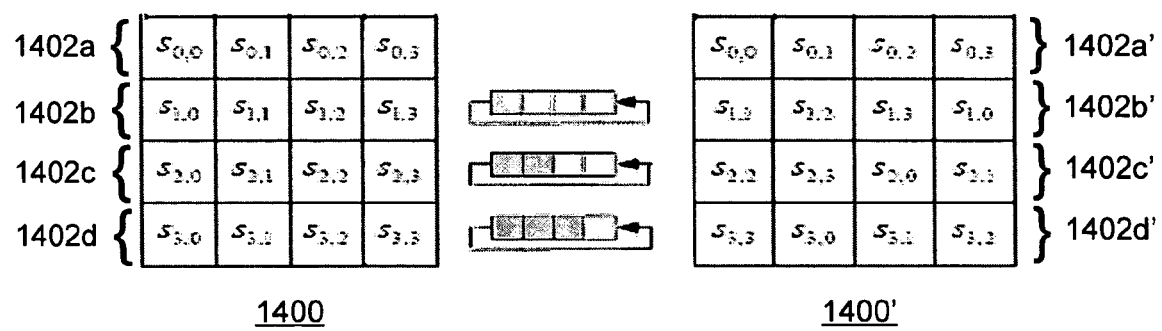
FIG. 17 is a block diagram illustrating a shift-row transformation, which may be used to implement the shift-row transformation of FIG. 13, in accordance with the present invention.

FIG. 17 is a block diagram illustrating a shift-row transformation, which may be used to implement the shift-row transformation of box 1304 of FIG. 13, in accordance with the present invention. In one embodiment, each row of the matrix 1400 is left shifted by 0, 1, 2, or 3 positions, respectively, for rows 0, 1, 2 or 3. In one embodiment, a row of PEs 220 in the PE array 204 is wrapped around in a cylindrical fashion (e.g., s03 is connected to s00, s13 is connected to s10 etc.) Each row of the PE array 204 may be considered a circular shift register, which is particularly useful in the Shift-Rows transformation. In one embodiment, the FSM 216 activates the Shift_W2E signal to shift all bytes from west to east of PE array 204. The Shift_W2E may be active during 4 cycles. Also, the enable signals activate only the PE that need to be shifted (e.g., at the first cycle only the 2$^{nd}$, 3$^{rd}$, and 4$^{th}$ rows of the PE are enabled; at the second cycle only the 3$^{rd}$ and 4$^{th}$ rows of the PE are enabled; and at the third cycle the 4$^{th}$ row of the PE is enabled).

Mix-Columns Transformation

Figure 18:
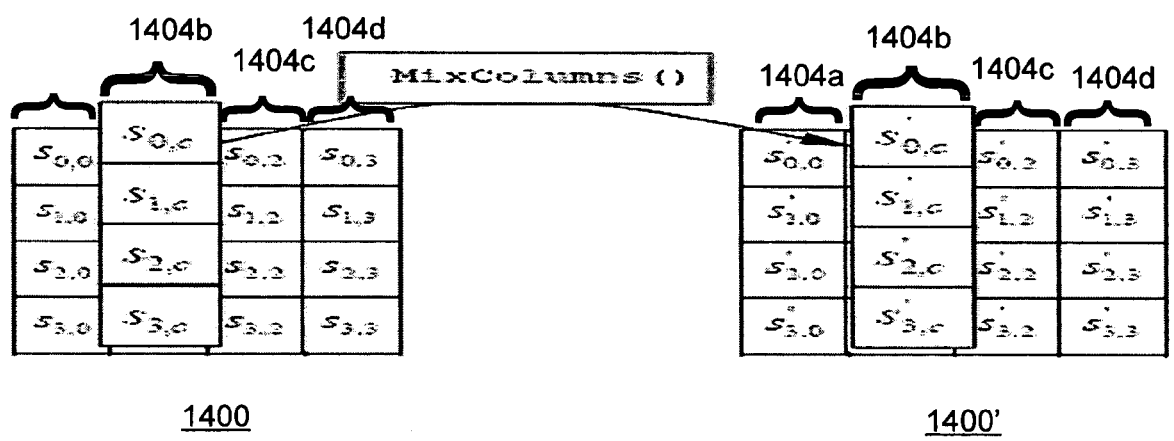
FIG. 18 is a block diagram illustrating a mix-columns transformation, which may be used to implement the mix-columns transformation of FIG. 13, in accordance with the present invention.

FIG. 18 is a block diagram illustrating a mix-columns transformation, which may be used to implement the mix-columns transformation of box 1306 of FIG. 13, in accordance with the present invention. As FIG. 18 illustrates, the mix-column transformation operates on the state column-by-column. The mix-columns transformation linearly combines all the data in each whole column. More specifically, in one embodiment, 4 vectors are applied to transform the 4 columns linearly.

The crypto-processor 200 performs the following matrix multiplication:

$$S'(x) = A(x) * S(x) \quad (1)$$

$$\begin{bmatrix} s^*_{0,c} \\ s^*_{1,c} \\ s^*_{2,c} \\ s^*_{3,c} \end{bmatrix} = \begin{bmatrix} 02 & 03 & 01 & 01 \\ 01 & 02 & 03 & 01 \\ 01 & 01 & 02 & 03 \\ 03 & 01 & 01 & 02 \end{bmatrix} \begin{bmatrix} s_{0,c} \\ s_{1,c} \\ s_{2,c} \\ s_{3,c} \end{bmatrix} \quad (2)$$

S(x) is the data transformed by the PE array 204, and A(x) is the matrix of multiplicative vectors, which is shown in (2).

The above multiplication may be performed by using logarithm and anti-logarithm tables. For example, $$c = a * b \quad (3)$$

can be computed by using logarithm tables in the following way:

$$c = \text{Log}^{-1}((\text{Log } a) + (\text{Log } b)) \quad (4)$$

Figures 19, 20:
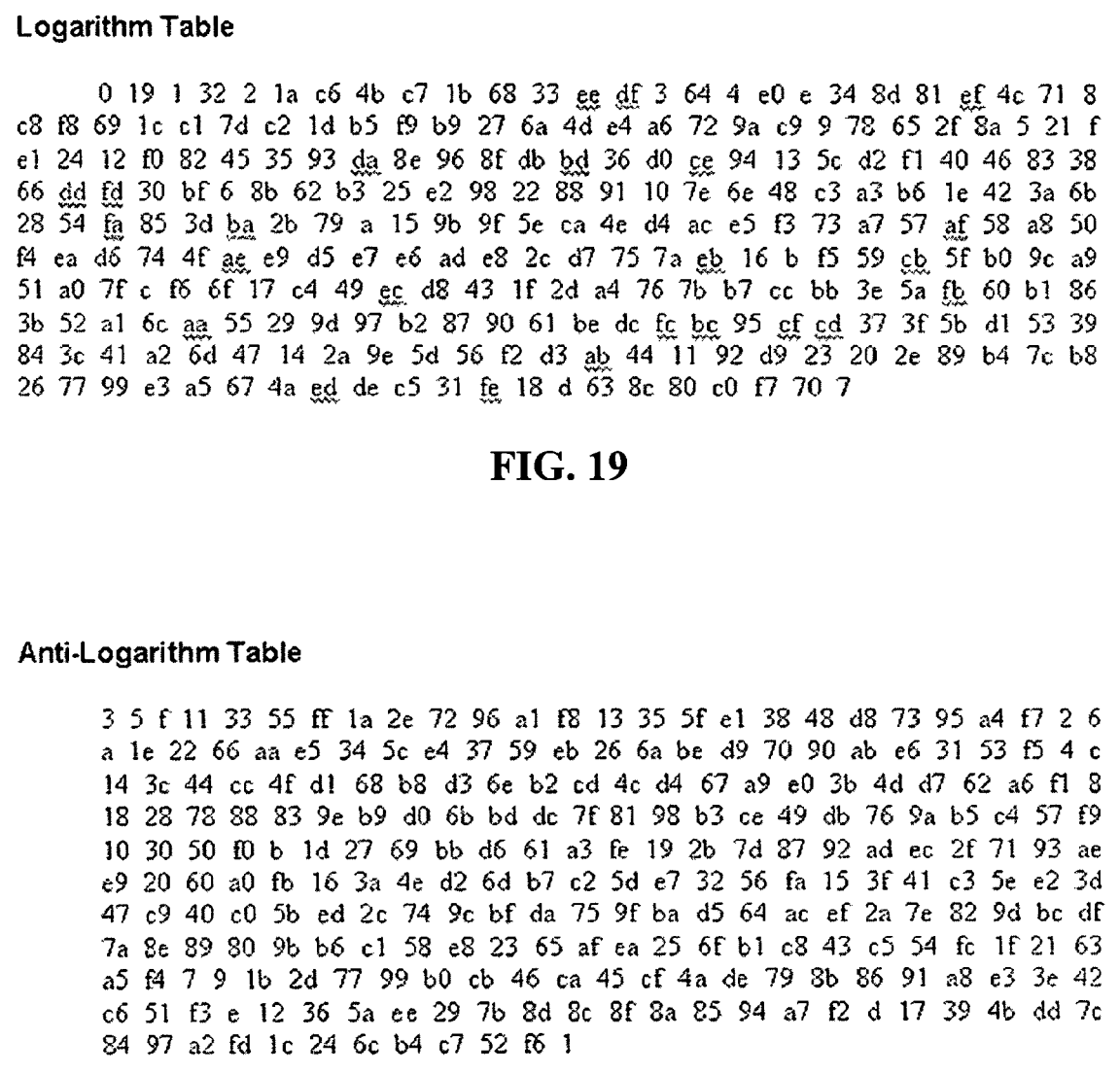

The crypto-processor 200 exploits logarithms in order to perform (4). FIG. 19 is an exemplary logarithm table, and FIG. 20 is an exemplary anti-logarithm table, in accordance with the present invention. In one embodiment, the mix-columns transformation computes each row separately. In order to compute the matrix multiplication of expression (1) and exploiting the expression (4), all of the bytes of the PE array 204 are substituted by using the logarithm tables (addition rather than a multiplication).

Figure 21:
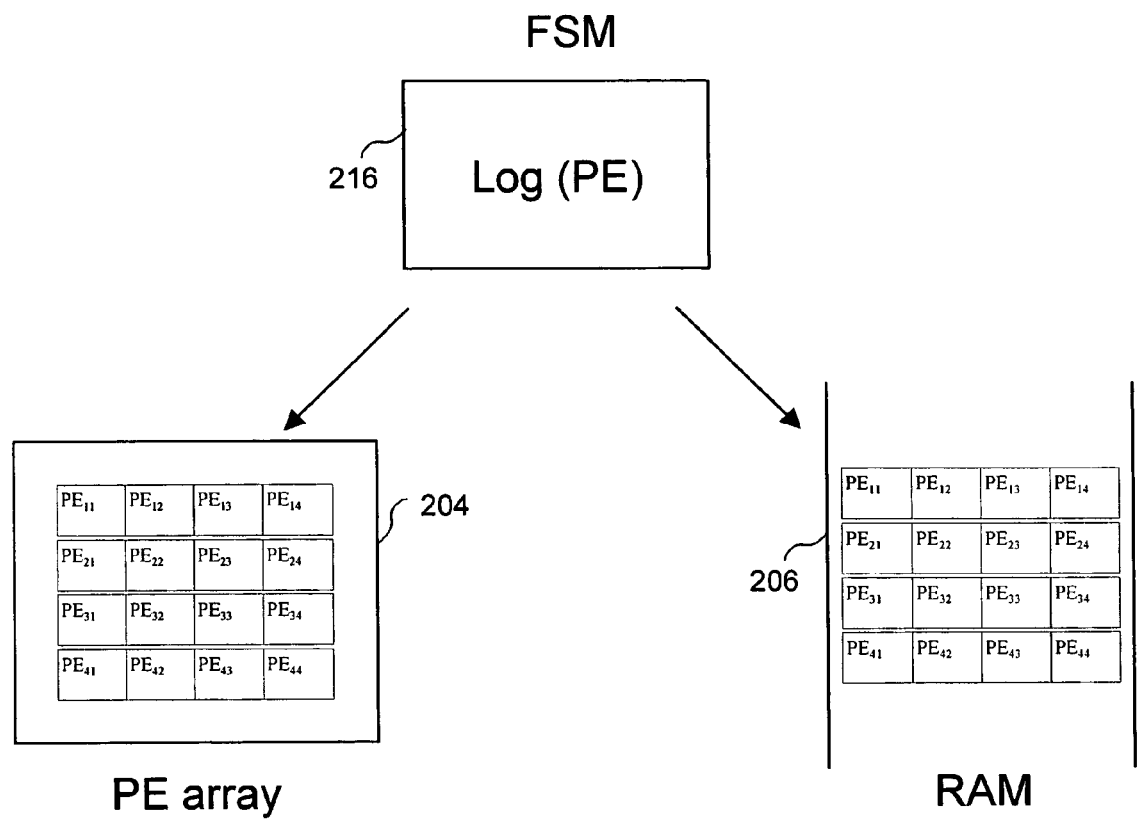
FIG. 21 is a block diagram of the finite state machine (FSM) of FIG. 8, in accordance with the present invention.

FIG. 21 is a block diagram of the FSM 216 of FIG. 8, in accordance with the present invention. In one embodiment, the FSM 216 extracts the logarithm of all bytes in the PE array 204 and writes the substituted bytes to the PE array 204. A copy of the logarithms is also written to the RAM 206 for further computations. For example, the multiplicative vectors, shown in the matrix (2) above are copied and added from the RAM 206 into the PE array 204. At this point, all of the bytes in the PE array 204 may be XORed by columns and written into the first row of PEs. In one embodiment, in order to do that, all bytes are shifted from southern to northern PEs. For example, in order to compute the data of PE11, the FSM 216 provides commands in order to XOR the data stored in PE21 with the data stored in PE11. The FSM 216 then stores the result into PE11. The data stored in PE31 is then copied and XORed with the data stored in PE11. Similarly, the data stored in PE41 is XORed with the data stored in PEB11. Next, PE11 is computed:

$$PE_{11} = PE_{11} \char`\^ PE_{21} \char`\^ PE_{31} \char`\^ PE_{41}$$

In one embodiment, the computation of the data stored in PE11 may be substantially simultaneously computed with the data stored in PE12, PE13, and PE14. Next, the first row of the PE array 204 is computed and the FSM 216 may compute the other three rows. The results of these computations may be stored in the RAM 206. In order to do so, the FSM 216 may copy the PE logarithms previously saved in the RAM 206. Once all 4×4 bytes will be computed, according to the expression (4) above, the FSM 216 may substitute them by using the antilogarithm tables.

Add-Round-Key Transformation

During the add-round-key transformation of box 1308 of FIG. 13, the final transformation of a given round, combines the key value with the transformed data. In one embodiment, the keys are loaded from the RAM 206 into the PE array 204 and XORed with data stored in the PE array 204. In one embodiment, the FSM 216 selects the RAM 206 as the source of the PE array 204 and enables PEs row-by-row to receive the keys, XORing them.

According to the system and method disclosed herein, the present invention provides numerous benefits. For example, embodiments of the present invention are efficient, flexible, and secure.

A system and method for encrypting data has been disclosed. The system includes a cryptographic processor that is built around a systolic array of PEs. In one embodiment, a systolic array is a matrix of processors that substantially simultaneously execute the same operations. The cryptographic processor may encrypt or decrypt data by using an encryption algorithm. In one embodiment, the cryptographic processor architecture implements the AES algorithm to encrypt/decrypt data. By utilizing the systolic array of PEs, the cryptographic processor encrypts and decrypts data efficiently and flexibly.

The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A system comprising:
    a controller; and
    a processing element array coupled to the controller, wherein the processing element array is operative to perform one or more of encryption functions and decryption functions using an encryption algorithm, the processing element array comprising a matrix of processors, wherein the matrix of processors is configured in an N×M matrix of processors, where N is greater than one and M is greater than one,
    each processor of the matrix comprising a multiplexor, wherein the multiplexor comprises a first input coupled to a first processor of the matrix, a second input coupled to a second processor of the matrix, a third input coupled to a third processor of the matrix, and a fourth input coupled to a fourth processor of the matrix;
    wherein the processing element array comprises a matrix of processors operative to reduce side-channel attacks by generating noise, wherein the PE array is operative to perform operations that generate noise to distract or eliminate the ability of an agent from detecting information sensitive data, and wherein the noise comprises electrical and algorithmic noise.

2. The system of claim 1 wherein the processing element array is systolic.

3. The system of claim 1 wherein each processor of the matrix comprises an operations unit for performing one or more of encryption-related and decryption-related operations.

4. The system of claim 1 wherein the encryption algorithm is based at least in part on an Advanced Encryption Standard (AES) algorithm.

5. The system of claim 1 wherein the controller is a sequencer.

6. A method comprising:
    providing a processing element array comprising a matrix of processors, wherein the matrix of processors is configured in an N×M matrix of processors, where N is greater than one and M is greater than one,
    each processor of the matrix comprising a multiplexor, wherein the multiplexor comprises a first input coupled to a first processor of the matrix, a second input coupled to a second processor of the matrix, a third input coupled to a third processor of the matrix, and a fourth input coupled to a fourth processor of the matrix;
    utilizing the processing element array to perform one or more of encryption functions and decryption functions using an encryption algorithm; and
    causing the processors of the matrix to generate noise to reduce side-channel attacks;
    wherein the processing element array comprises a matrix of processors operative to perform operations that generate noise to distract or eliminate the ability of an agent from detecting information sensitive data, and wherein the noise comprises electrical and algorithmic noise.

7. The method of claim 6 wherein the utilizing comprises performing cryptographic transformations on data.

8. The method of claim 7 wherein the cryptographic transformations performing comprises:
    performing at least one sub-bytes transformation;
    performing at least one shift-rows transformation;
    performing at least one mix-columns transformation; and
    performing at least one add-round-key transformation.

9. The method of claim 6 wherein the processing element array is systolic.

10. The method of claim 6 wherein the encryption algorithm is based at least in part on an Advanced Encryption Standard (AES) algorithm.

11. A computer-readable storage device containing program instructions for conserving power, the program instructions which when executed by a computer system cause the computer system to execute a method comprising:
    providing a processing element array comprising a matrix of processors, wherein the matrix of processors is configured in an N×M matrix of processors, where N is greater than one and M is greater than one,
    each processor of the matrix comprising a multiplexor, wherein the multiplexor comprises a first input coupled to a first processor of the matrix, a second input coupled to a second processor of the matrix, a third input coupled to a third processor of the matrix, and a fourth input coupled to a fourth processor of the matrix;
    utilizing the processing element array to perform one or more of encryption functions and decryption functions using an encryption algorithm; and
    causing the processors of the matrix to generate noise to reduce side-channel attacks;
    wherein the processing element array comprises a matrix of processors operative to perform operations that generate noise to distract or eliminate the ability of an agent from detecting information sensitive data, and wherein the noise comprises electrical and algorithmic noise.

12. The computer-readable storage device of claim 11 wherein the utilizing comprises program instructions for performing cryptographic transformations on data.

13. The computer-readable storage device of claim 12 wherein the cryptographic transformations performing comprises program instructions for:
    performing at least one sub-bytes transformation;
    performing at least one shift-rows transformation;
    performing at least one mix-columns transformation; and
    performing at least one add-round-key transformation.

14. The computer-readable storage device of claim 11 wherein the processing element array is systolic.

15. The computer-readable storage device of claim 11 wherein the encryption algorithm is based at least in part on an Advanced Encryption Standard (AES) algorithm.

* * * * *